US012563027B1

(12) United States Patent
Gassner et al.

(10) Patent No.: US 12,563,027 B1
(45) Date of Patent: Feb. 24, 2026

(54) SYSTEM AND METHOD FOR MANAGING USER AUTHENTICATION

(71) Applicant: Veeva Systems Inc., Pleasanton, CA (US)

(72) Inventors: Peter Gassner, Pleasanton, CA (US); Christopher Page van Löben Sels, Oakland, CA (US); Scott Nelson Stanton, Menlo Park, CA (US); Timothy Barry Powell, Dublin, CA (US)

(73) Assignee: Veeva Systems Inc., Pleasanton, CA (US)

( * ) Notice: Subject to any disclaimer, the term of this patent is extended or adjusted under 35 U.S.C. 154(b) by 139 days.

(21) Appl. No.: 18/488,999

(22) Filed: Oct. 17, 2023

(51) Int. Cl.
*G06F 21/00* (2013.01)
*H04L 9/40* (2022.01)

(52) U.S. Cl.
CPC ............................... *H04L 63/0815* (2013.01)

(58) Field of Classification Search
CPC ..... H04L 63/0815; H04L 63/00; H04L 63/08; G06F 21/00; G06F 21/30; H04W 12/06

USPC .............................................................. 726/8
See application file for complete search history.

(56) References Cited

U.S. PATENT DOCUMENTS

| 9,064,285 | B1 * | 6/2015 | Nathoo | ................ | G06Q 40/125 |
| 11,368,422 | B1 * | 6/2022 | Sohn | ...................... | H04L 51/212 |
| 2002/0138577 | A1 * | 9/2002 | Teng | ...................... | G06F 16/986 |
| | | | | | 709/205 |
| 2015/0310438 | A1 * | 10/2015 | Kassemi | .............. | G06Q 20/386 |
| | | | | | 705/44 |
| 2020/0089538 | A1 * | 3/2020 | Cherniavsky | ......... | G06F 9/5011 |
| 2022/0086133 | A1 * | 3/2022 | Killoran, Jr. | ........ | H04L 63/0807 |

* cited by examiner

*Primary Examiner* — Josnel Jeudy

(57) ABSTRACT

Systems and methods for managing user authentication in a computer network. Users don't need a password or SSO integration. The system may determine the organization the user is associated with by the user's email address, and authenticate the user if the organization is authorized and stored in a storage system previously. The system may add user's information to the storage system. The system may attempt to detect when to de-provision a user by regularly sending a test email to the user's email address, and remove the user's email address from the storage system when the test email bounces.

14 Claims, 7 Drawing Sheets

120a

112

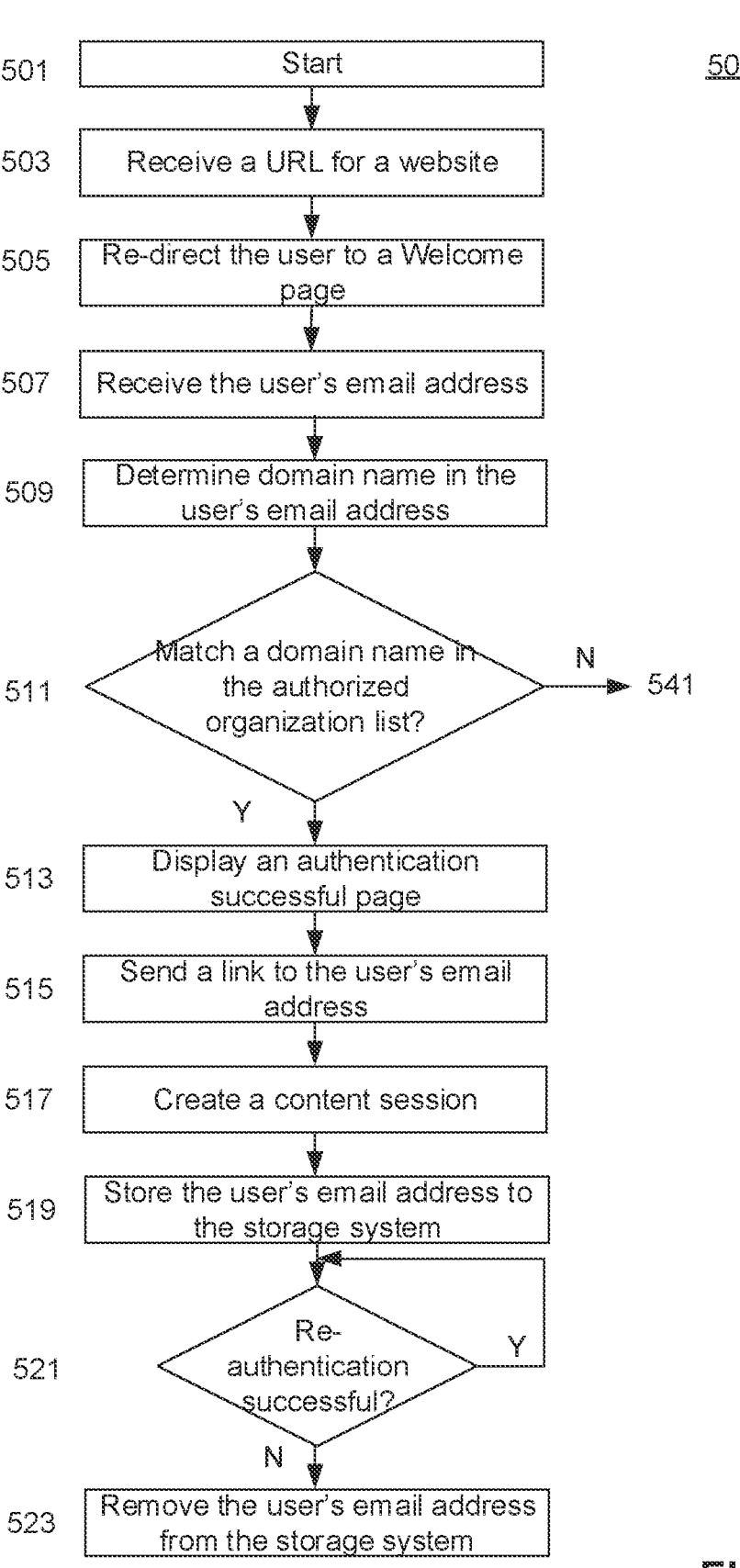

501 — Start

500

503 — Receive a URL for a website

505 — Re-direct the user to a Welcome page

507 — Receive the user's email address

509 — Determine domain name in the user's email address

511 — Match a domain name in the authorized organization list?

N — 541

Y

513 — Display an authentication successful page

515 — Send a link to the user's email address

517 — Create a content session

519 — Store the user's email address to the storage system

521 — Re-authentication successful?

Y

N

523 — Remove the user's email address from the storage system

531   Receive a URL for a website

533   Re-direct the user to the Welcome page

535   Receive the user's email address

537   Match a stored email address?

N  → 509

Y

539   Create a content session

SYSTEM AND METHOD FOR MANAGING USER AUTHENTICATION

BACKGROUND

The present application relates to systems and methods for managing user authentication in a computer network.

Nowadays, many websites require users to provide user authentication information (e.g. a password) to sign up, and input the user authentication information to sign in and use the website. It is very inconvenient for users to remember and input the authentication information for so many websites, especially when different websites have different requirements for the passwords, e.g., length. Therefore, it is desirable to provide a method and system for easy, simple and convenient user authentication.

SUMMARY

The disclosed subject matter relates to a method for managing user authentication. The method comprises: receiving a request for accessing a first resource in the computer network; and displaying a first user interface, where the first user interface comprises a first area for receiving a user email address. The method comprises: receiving a first user email address at the first area on the first user interface; determining a first email address domain in the first user email address; determining that the first email address domain matches a domain in an authorized organization domain list in domain names previously stored in the storage device in the user authentication management system; displaying a second user interface, indicating that a first link is to be sent to the first user email address; and generating and sending the first link to the first user email address, wherein the first link enables connection to a first content page of the first resource. The method further comprises: displaying the first content page of the first resource in response to an input on the first link; and storing the first user email address to the storage device to enable access to the first resource without asking for a password.

BRIEF DESCRIPTION OF THE DRAWINGS

FIGS. 5A, 5B and 5C illustrate an example flowchart of a method for managing user authentication according to one embodiment of the present invention.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, well-known structures and components are shown in block diagram form in order to avoid obscuring the concepts of the subject technology.

The present invention provides a system and method for managing user authentication in a computer network. Users don't need a password or SSO integration. The system may determine the organization the user is associated with by the user's email address, and authenticate the user if the organization is authorized and stored in a storage system previously. The system may add user's information to the storage system. The system may attempt to detect when to de-provision a user by regularly sending a test email to the user's email address, and remove the user's email address from the storage system when the test email bounces.

Figure 1:
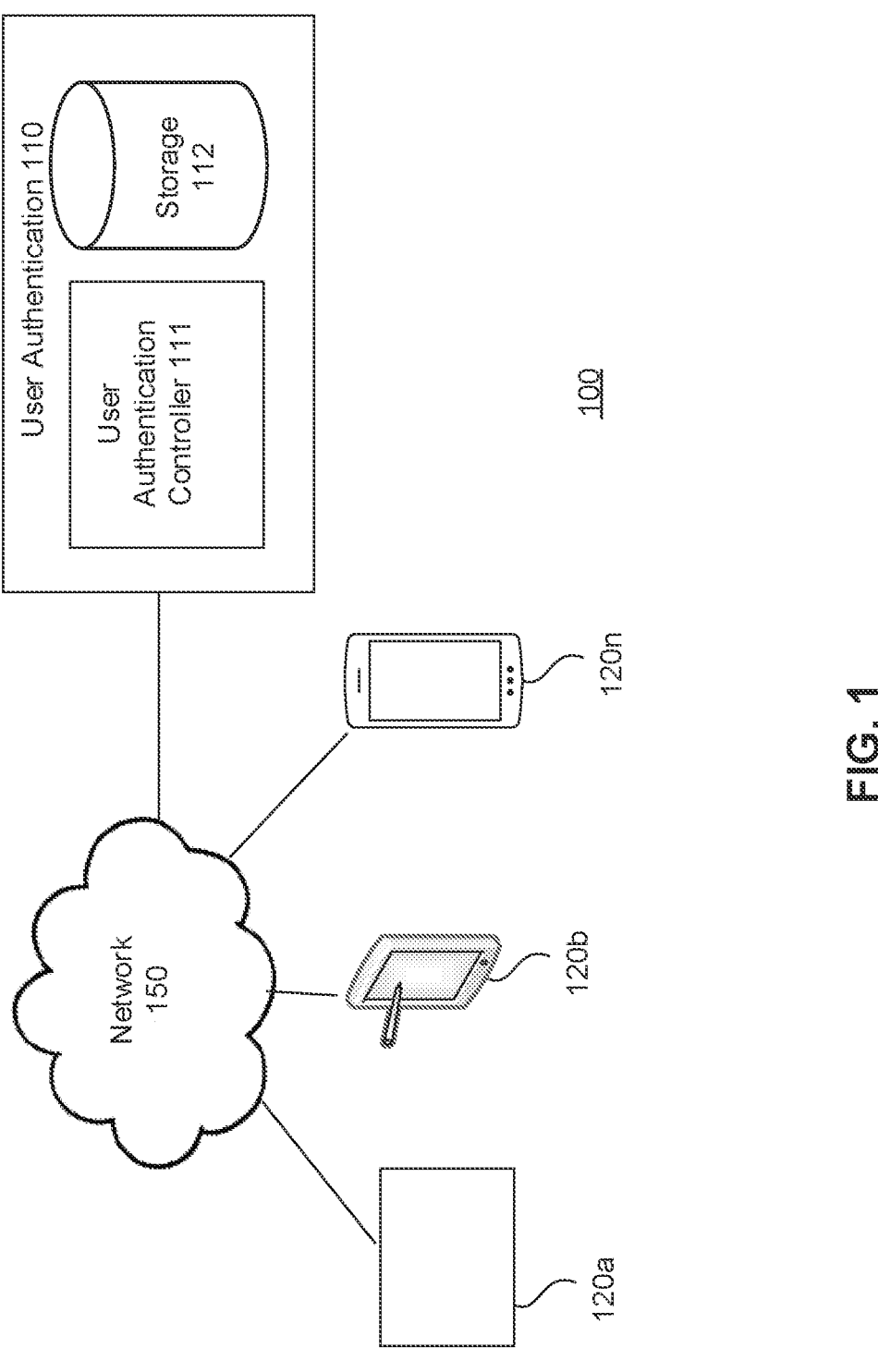
FIG. 1 illustrates an example high level block diagram of a system for managing user authentication wherein the present invention may be implemented.

FIG. 1 illustrates an example high level block diagram of a system for managing user authentication 100 wherein the present invention may be implemented. As shown, the system 100 may include a plurality of user computing devices 120a, 120b, . . . 120n, and a user authentication system 110, coupled to each other via a network 150. The user authentication system 110 may include a user authentication controller 111, and a storage system 112. The network 150 may include one or more types of communication networks, e.g., a local area network ("LAN"), a wide area network ("WAN"), an intra-network, an inter-network (e.g., the Internet), a telecommunication network, and peer-to-peer networks (e.g., ad hoc peer-to-peer networks), which may be wired or wireless.

The user computing devices 120a-120n may be any machine or system that is used by a user to access the various websites via the network 150, and may be any commercially available computing devices including laptop computers, desktop computers, mobile phones, smart phones, tablet computers, netbooks, and personal digital assistants (PDAs). User computing devices 120a-120n are illustrated in more detail in FIG. 3.

The user authentication controller 111 is typically a remote computer system accessible over a remote or local network, such as the network 150. The user authentication controller 111 could be any commercially available computing devices.

In one implementation, the storage system 112 may store information of authorized organizations (e.g., a customer) and profile information of authenticated users (e.g., email address, office address, phone number, expertise, and professional profile).

Figure 2:
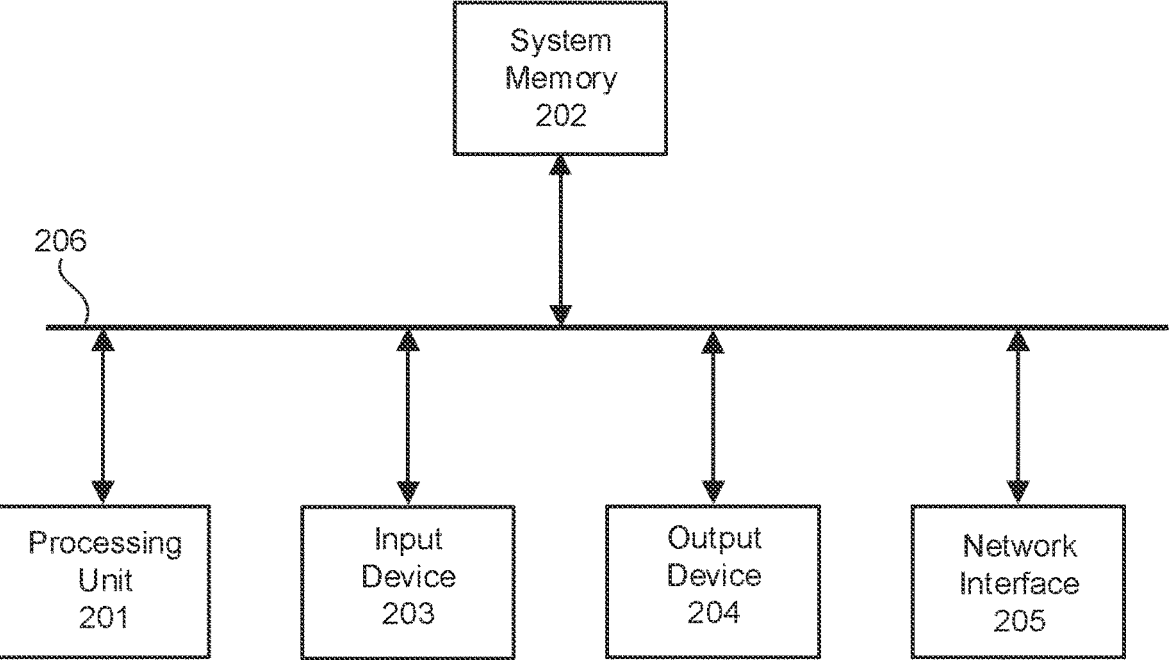
FIG. 2 illustrates an example block diagram of a computing device.

FIG. 2 illustrates an example block diagram of a computing device 200 which can be used as the user computing devices 120a-120n, and the user authentication controller 111 in FIG. 1. The computing device 200 is only one example of a suitable computing environment and is not intended to suggest any limitation as to scope of use or functionality. The computing device 200 may include a processing unit 201, a system memory 202, an input device 203, an output device 204, a network interface 205 and a system bus 206 that couples these components to each other.

The processing unit 201 may be configured to execute computer instructions that are stored in a computer-readable medium, for example, the system memory 202. The processing unit 201 may be a central processing unit (CPU).

The system memory 202 typically includes a variety of computer readable media which may be any available media accessible by the processing unit 201. For instance, the system memory 202 may include computer storage media in the form of volatile and/or nonvolatile memory such as read only memory (ROM) and/or random access memory (RAM). By way of example, but not limitation, the system memory 202 may store instructions and data, e.g., an operating system, program modules, various application programs, and program data.

A user can enter commands and information to the computing device 200 through the input device 203. The input device 203 may be, e.g., a keyboard, a touchscreen input device, a touch pad, a mouse, a microphone, and/or a pen.

The computing device 200 may provide its output via the output device 204 which may be, e.g., a monitor or other type of display device, a speaker, or a printer.

The computing device 200, through the network interface 205, may operate in a networked or distributed environment using logical connections to one or more other computing devices, which may be a personal computer, a server, a router, a network PC, a peer device, a smart phone, or any other media consumption or transmission device, and may include any or all of the elements described above. The logical connections may include a network (e.g., the network 150) and/or buses. The network interface 205 may be configured to allow the computing device 200 to transmit and receive data in a network, for example, the network 150. The network interface 205 may include one or more network interface cards (NICs).

Figure 3:
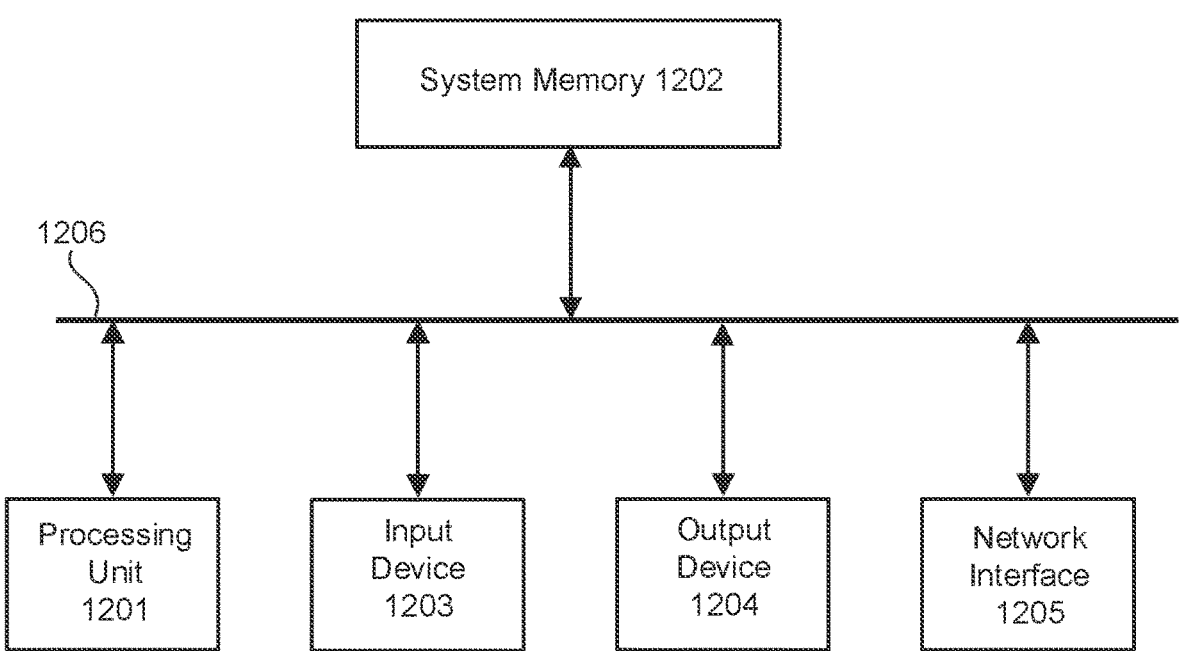
FIG. 3 illustrates an example high level block diagram of a user computing device.

FIG. 3 illustrates an example high level block diagram of a user computing device (e.g., 120a) wherein the present invention may be implemented. The user computing device 120a may be implemented by the computing device 200 described above, and may have a processing unit 1201, a system memory 1202, an input device 1203, an output device 1204, and a network interface 1205, coupled to each other via a system bus 1206.

Figure 4:
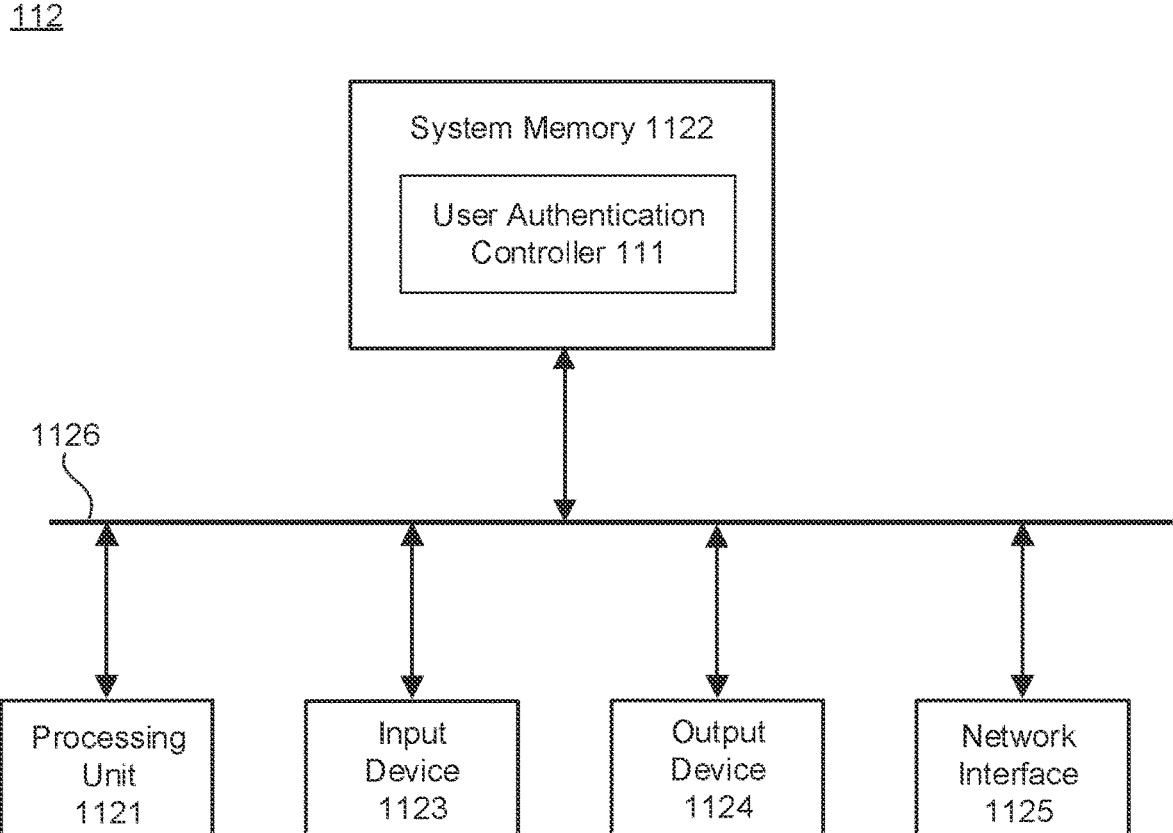
FIG. 4 illustrates an example high level block diagram of the server for managing user authentication according to one embodiment of the present invention.

FIG. 4 illustrates an example high level block diagram of the user authentication controller 111 according to one embodiment of the present invention. The user authentication controller 111 may be implemented by the computing device 200, and may have a processing unit 1121, a system memory 1122, an input device 1123, an output device 1124, and a network interface 1125, coupled to each other via a system bus 1126.

Figure 5B:
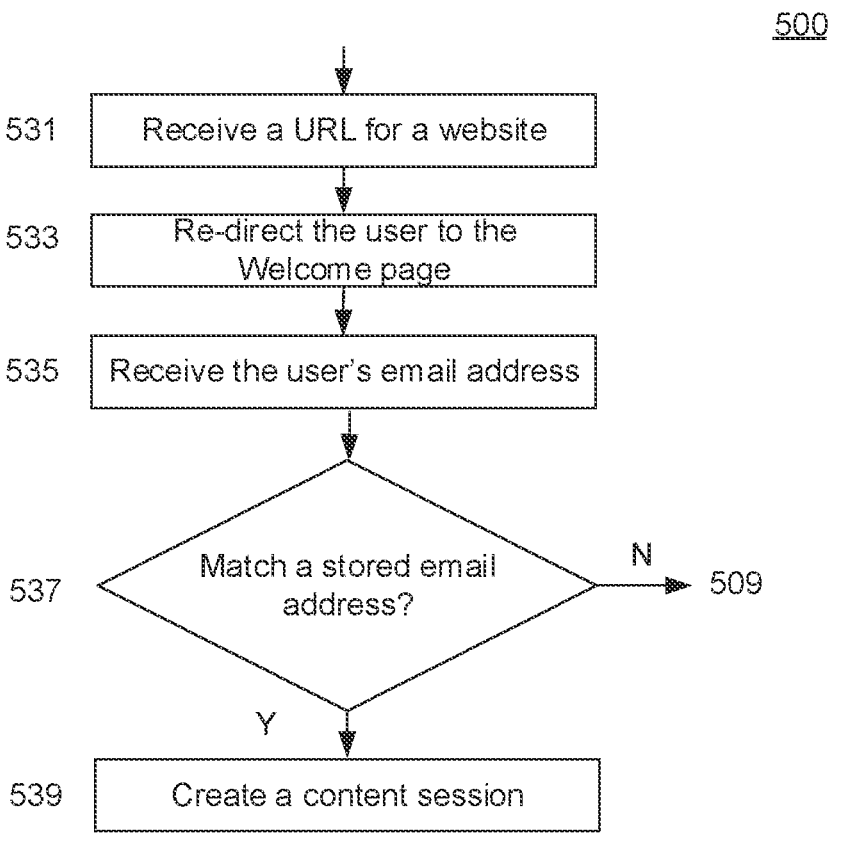
Figure 5C:
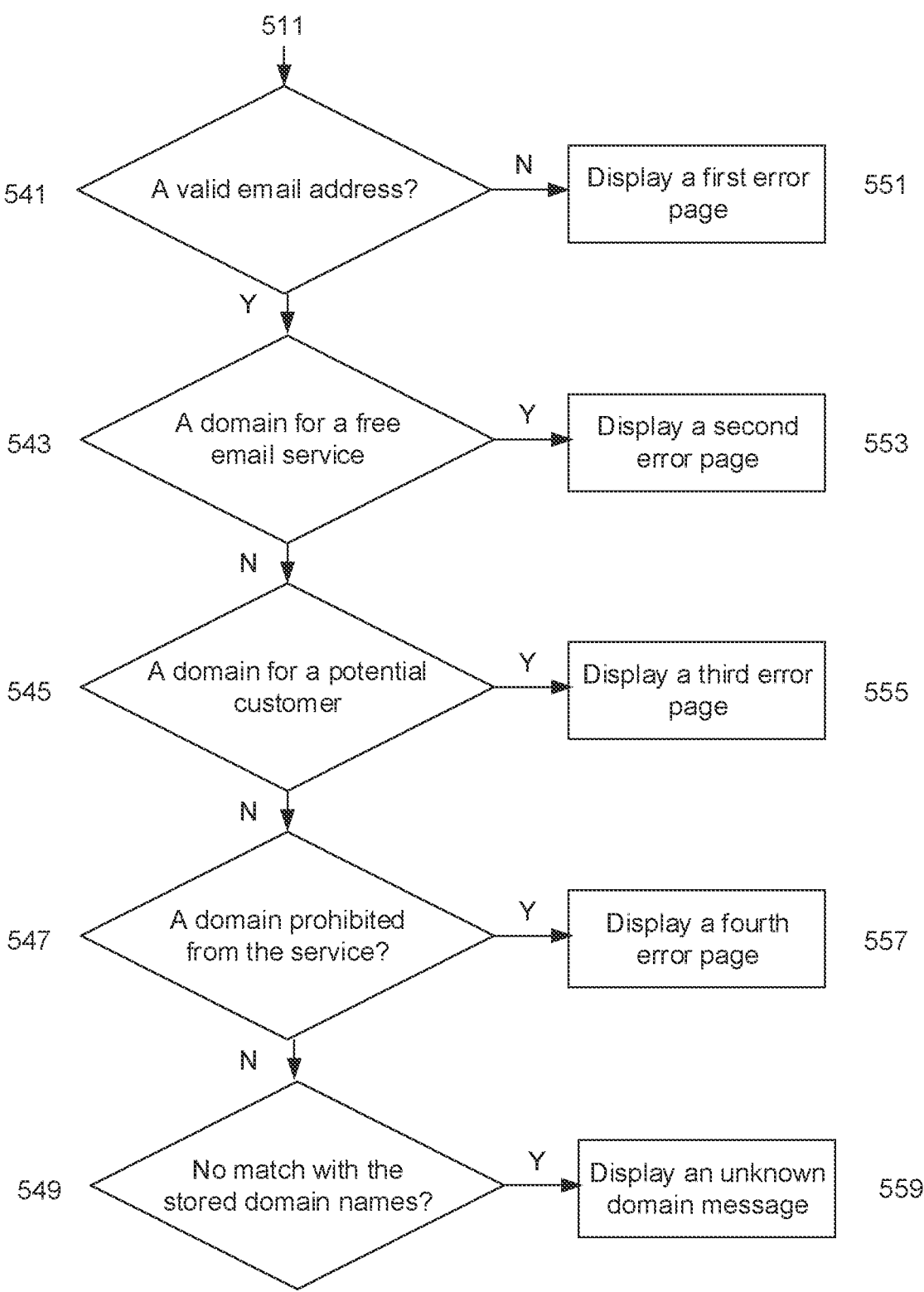

FIGS. 5A, 5B and 5C illustrate an example flowchart of a method for managing user authentication according to one embodiment of the present invention. The process may be controlled by the user authentication controller 111 and start at 501.

At 503, a user may input a Uniform Resource Locator ("URL") of a resource in the computer network, e.g., a website.

Content pages of the website may require a connect session. If the user does not have an active session, the user is redirected to a Welcome page and prompted for an email address at 505. In one embodiment, the Welcome page may present the user an input box, with the hint text "Provide an email address".

In one embodiment, the Welcome page may offer a link to the Privacy Policy.

At 507, the user's email address (e.g., John.smith@123pharma.com) may be received on the Welcome page. The user's email address may include the user's identity information assigned by the organization he/she is associated with (e.g., his first name John and last name Smith), the domain name of the organization (e.g., 123pharma) and an extension (e.g., .com).

At 509, the domain name of the received email address (e.g., 123pharma) may be determined.

The domain name of the received email address may be compared with domain names previously stored in the storage system 112 at 511. In one embodiment, the domain names previously stored in the storage system 112 may have a number of subsets, e.g., a list of domain names of authorized organizations, and an exclusion list. In one embodiment, the exclusion list may include a first list of domain names for free email services, a second list of domain names for potential customers, and a third list for domain names prohibited from the service.

If there is a match between the domain name of the received email address and the domain names of authorized organizations, an authentication successful page may be displayed at 513, and the user is authenticated to access the content page and informed that a link will be sent to his email address. Otherwise, the process may proceed to 541.

The link may be emailed to the user's email address at 515.

At 517, a content session may be created by re-directing the user back to the originally requested page when the link emailed to the user is clicked on.

In one embodiment, the user may click on a button (e.g., Connect) to access the content page.

In one embodiment, any user who has not been reauthenticated in a predetermined period of time (e.g., 30 days) may be re-directed to the Welcome page.

At 519, the user's email address may be stored in the storage system 112 so that the user does not have to be authenticated again until his email address is deactivated.

The system may deactivate users on request or automatically when the email no longer appears active. At 521, it may be determined if the user's email address is still valid when a predetermined period of time expires, e.g., a month after the user was authenticated for the first time. In one embodiment, a test email may be sent to the user's email address periodically. If it is bounced back, the user's email address is not valid anymore.

In one embodiment, an email or contact information verification solution may be used to verify the user's email address, and the user may be deactivated if the verification fails.

At 523, the user's email address may be removed from the storage system 112, and the user can't access the content page anymore.

When a request for accessing the resource associated with the same user email address is received, no further user authentication will be performed. At 531, a user may input a Uniform Resource Locator ("URL") of the resource in the computer network, e.g., a website.

The user is redirected to a Welcome page and prompted for an email address at 533. In one embodiment, the Welcome page may present the user an input box, with the hint text "Provide an email address".

At 535, the user's email address (e.g., John.smith@123pharma.com) may be received on the Welcome page.

At 537, it may be determined if the user's email address matches email addresses previously stored in the storage system 112.

If yes, a content session may be created by re-directing the user back to the originally requested page at 539. No further user authentication needs to be performed.

Otherwise, the process may return to 509.

If the user's email address matches a domain name in the exclusion list, the user may be informed that there is an error.

In one embodiment, if it is determined at 541 that the user's email address is not a valid email address, e.g., missing the extension, a first error page may be displayed at 551 and prompts "Please provide a valid email address".

If it is determined at 543 that there is a match between the domain name of the user's email address and the first list of domain names for free email services (e.g., yahoo.com), a second error page may be displayed at 553 and prompts, e.g., "Please provide a work email address. If you believe you got this message in error, please contact your account executive for assistance."

If it is determined 545 that the user's email address matches the second list of domain names for potential customers, a third error page may be displayed at 555, e.g., "We're sorry, we have not launched the service for your organization yet. We'll keep you posted. If you believe you got this message in error, please contact your account executive for assistance."

If it is determined at 547 that the user's email address matches the third list for domain names prohibited from the service, a fourth error page may be displayed 557, e.g., "Your domain, <domain>, is not authorized."

If it is determined at 549 that the user's email domain name is not found in either the authorized organization list or exclusion list, the user is directed to an Unknown Domain page (or the page displays the Unknown Email message) at 559. The unknown domain page informs the user that his email domain isn't a recognized domain.

In one embodiment, the user may create his/her profile for the system, which may include the user's contact information, role and a self-introduction to be shared with other users. In one embodiment, the Welcome page may include windows for the user to input his/her profile information. In one embodiment, a system administrator may collect the user's profile information and input it into the system. The profile information may include: First name, Last name, Email address, Title, and organization.

In one embodiment, a user may build up a user group to share information and communicate among the users.

In one embodiment, a customer account team and group owners may add users or update their profile information. The system may present changes to the user to validate.

In one embodiment, user profiles may be created by other users. Users associated with the system may create profiles for users not associated with the system, e.g., a customer, or a professional contact. Users associated with other organizations may create profiles for users within their own organization.

In one embodiment, the system administrator may add user profiles to any organization.

Users can add themselves by successfully logging in with an email domain linked to an active organization or group.

In one embodiment, a user creation UI may be displayed for adding user profiles. In one embodiment, an organization homepage may be displayed for adding a user profile to the organization, and a group home page may be created for adding a user profile to the group.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

In this specification, the term "software" is meant to include firmware residing in read-only memory or applications stored in magnetic storage, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs. Examples of computer programs or computer code include machine code, for example is produced by a compiler, and files including higher-level code that are executed by a computer, an electronic component, or a microprocessor using an interpreter.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

It is understood that any specific order or hierarchy of steps in the processes disclosed is an illustration of example approaches. Based upon design preferences, it is understood that the specific order or hierarchy of steps in the processes may be rearranged, or that all illustrated steps be performed.

Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more.

What is claimed is:

1. A computer-implemented method for managing user authentication in a computer network with a user authentication management system, wherein the user authentication management system comprises a user authentication management controller and a storage device, the method comprising:

receiving a request for accessing a first resource in the computer network;

displaying a first user interface, where the first user interface comprises a first area for receiving a user email address;

receiving a first user email address at the first area on the first user interface;

determining a first email address domain in the first user email address;

determining that the first email address domain matches a domain name in an authorized organization domain name list in domain names previously stored in the storage device in the user authentication management system, the storage device storing the authorized organization domain name list and an exclusion list, wherein the exclusion list includes a subset for a free email service, a subset for a potential customer, and a subset prohibited from accessing the first resource in the computer network;

displaying a second user interface, indicating that a first link is available in an email at the first user email address;

generating and sending the first link to the first user email address, wherein the first link enables connection to a first content page of the first resource;

displaying the first content page of the first resource in response to an input on the first link; and storing the first user email address to the storage device to enable access to the first resource without asking for a password.

2. The method of claim 1, further comprising:

receiving a second request for access the first resource in the computer network;

displaying the first user interface, where the first user interface comprises the first area for receiving the user email address;

receiving the first user email address at the first area on the first user interface;

determining that the first user email address matches an email address in the storage device and has been authenticated; and displaying the first content page of the first resource.

3. The method of claim 2, further comprising:

receiving a third request for access the first resource in the computer network;

determining that a first predetermined period of time has expired;

displaying the first user interface, where the first user interface comprises the first area for receiving the user email address;

receiving the first user email address at the first area on the first user interface;

determining that the first email address domain matches a domain name in an authorized organization domain name list in domain names previously stored in the storage device in the user authentication management system; and displaying the first content page of the first resource.

4. The method of claim 2, further comprising:

determining that a second predetermined period of time has expired;

sending a test email to the first user email address;

receiving a bounce email from the first user email address; and removing the first user email address from the storage device.

5. The method of claim 2, wherein domain names previously stored in the storage device in the user authentication management system comprises an exclusion list.

6. The method of claim 5, where the exclusion list comprises a domain for a free email service.

7. The method of claim 6, further comprising:

determining that a second user email address matches the domain for a free email service; and displaying a third user interface, requesting for a work email address.

8. The method of claim 5, where the exclusion list comprises a domain for a potential customer.

9. The method of claim 8, further comprising:

determining that a third user email address matches the domain for the potential customer; and displaying a fourth user interface and indicating that the first resource is not available yet.

10. The method of claim 5, where the exclusion list comprises a domain prohibited from accessing the first resource.

11. The method of claim 10, further comprising:

determining that a fourth user email address matches the domain prohibited from accessing the first resource; and displaying a fifth user interface indicating that the first resource is not available.

12. The method of claim 2, further comprising:

determining that a fifth user email address does not match any domain previously stored in the storage device; and displaying a sixth user interface indicating that that domain name in the fifth user email address is unknown.

13. A system for managing user authentication in a computer network, comprising:

a storage device storing an authorized organization domain name list and an exclusion list, wherein the exclusion list includes a subset for a free email service, a subset for a potential customer, and a subset prohibited from accessing a first resource in the computer network;

a user authentication management controller performing the steps of a method, including:

receiving a request for accessing the first resource in the computer network;

displaying a first user interface, where the first user interface comprises a first area for receiving a user email address;

receiving a first user email address at the first area on the first user interface;

determining a first email address domain in the first user email address;

determining that the first email address domain matches a domain name in the authorized organization domain name list in domain names previously stored in the storage device in the user authentication management system;

displaying a second user interface, indicating that a first link is available in an email at the first user email address;

generating and sending the first link to the first user email address, wherein the first link enables connection to a first content page of the first resource;

displaying the first content page of the first resource in response to an input on the first link; and storing the first user email address to the storage device to enable access to the first resource without asking for a password.

14. A non-transitory computer readable medium storing instructions that, when executed by a processor, perform a computer-implemented method for managing user authentication in a computer network with a user authentication management system, wherein the user authentication management system comprises a user authentication management controller and a storage device, the computer-implemented method comprising:

receiving a request for accessing a first resource in the computer network;

displaying a first user interface, where the first user interface comprises a first area for receiving a user email address;

receiving a first user email address at the first area on the first user interface;

determining a first email address domain in the first user email address;

determining that the first email address domain matches a domain name in an authorized organization domain name list in domain names previously stored in the storage device in the user authentication management system, the storage device storing the authorized organization domain name list and an exclusion list, wherein the exclusion list includes a subset for a free email service, a subset for a potential customer, and a subset prohibited from accessing the first resource in the computer network;

displaying a second user interface, indicating that a first link is available in an email at the first user email address;

generating and sending the first link to the first user email address, wherein the first link enables connection to a first content page of the first resource;

displaying the first content page of the first resource in response to an input on the first link; and storing the first user email address to the storage device to enable access to the first resource without asking for a password.

* * * * *